(12) United States Patent
Oh

(10) Patent No.: US 6,771,250 B1
(45) Date of Patent: Aug. 3, 2004

(54) PORTABLE COMPUTER SYSTEM HAVING APPLICATION PROGRAM LAUNCHER FOR LOW POWER CONSUMPTION AND METHOD OF OPERATING THE SAME

(75) Inventor: Jae-Choeul Oh, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 465 days.

(21) Appl. No.: 09/626,485

(22) Filed: Jul. 26, 2000

(30) Foreign Application Priority Data

Jul. 27, 1999 (KR) ........................................ 1999-30694

(51) Int. Cl.$^7$ .............................. G09G 5/00; G06F 1/32
(52) U.S. Cl. ...................... 345/156; 345/901; 345/781; 345/810; 345/173; 713/320; 713/321
(58) Field of Search ................................ 713/320, 321; 345/211, 684, 781, 784, 785, 786, 810, 156–169, 901, 902, 173; 273/148 B; 463/37–38

(56) References Cited

U.S. PATENT DOCUMENTS

| | | | |
|---|---|---|---|
| 5,452,240 A | * 9/1995 | Roca et al. | ............ 364/705.06 |
| 5,473,754 A | * 12/1995 | Folwell et al. | ......... 395/183.21 |
| 5,790,875 A | * 8/1998 | Andersin et al. | ........... 364/707 |
| 5,825,353 A | * 10/1998 | Will | ............................ 345/184 |
| 5,900,875 A | 5/1999 | Haitani et al. | ............... 345/349 |
| 6,006,335 A | * 12/1999 | Choi et al. | ................... 713/310 |
| 6,076,169 A | * 6/2000 | Lee | ............................. 713/320 |
| 6,121,962 A | * 9/2000 | Hwang | ........................ 345/211 |

* cited by examiner

*Primary Examiner*—Lun-Yi Lao
(74) *Attorney, Agent, or Firm*—Robert E. Bushnell, Esq.

(57) ABSTRACT

A hand-held computer is described, which comprises an application program launcher having a multi-point switch. Using the launcher, a user selects and executes one of several application programs registered in a program selection menu. If a launching signal is generated from the launcher when the hand-held computer is at a low power consumption mode, the hand-held computer wakes up from a sleep mode and its mode is converted into a normal mode. At this time, a program selection menu is displayed on a screen. If an application program is not selected before a predetermined time elapses, the hand-held computer re-enters the low power consumption sleep mode without delay. Thus, it is possible to prevent the hand-held computer from consuming unnecessary power.

6 Claims, 4 Drawing Sheets

PORTABLE COMPUTER SYSTEM HAVING APPLICATION PROGRAM LAUNCHER FOR LOW POWER CONSUMPTION AND METHOD OF OPERATING THE SAME

CLAIM OF PRIORITY

This application makes reference to, incorporates the same herein, and claims all benefits accruing under 35 U.S.C. §119 from the inventor's application PORTABLE COMPUTER SYSTEM HAVING APPLICATION PROGRAM LAUNCHER FOR LOW POWER CONSUMPTION AND OPERATING METHOD THERFOR filed with the Korean Industrial Property Office on Jul. 27, 1999 and there duly assigned Serial No. 1999-30694.

BACKGROUND OF THE INVENTION

1. Field of the Invention

The present invention relates to portable computer processes and systems generally and, more particularly, to hand-held computers and processes for operating hand-held computers.

2. Description of the Related Art

A hand-held computer, such as a palmtop computer or a personal digital assistance (PDA), may be designed to provide various functions, such as a promise schedule, an address book, a memorandum book, a facsimile transmission, a data communication, and so on, for the sake of recent personal daily business. A hand-held computer may be supported by a writing recognition technique and thus a user is able to input hand-written information thereinto using a pen input device such as a stylus.

Some hand-held computers may have one or more application program launching button switches for immediate execution of application programs. Using one of the launching button switches, a user can immediately execute a specific corresponding application program. For example, a user can immediately execute an address book application program or a facsimile transmission/reception program. An example of such a hand-held computer is disclosed in U.S. Pat. No. 5,900,875, entitled Method And Apparatus For Interacting With A Portable Compute System issued to Robert Yuji Haitani et al. issued on May 4, 1999. This style of hand-held computer has a plurality of launching button switches eliminates the inconvenience that a user must manually execute a specific application program through many operating steps. Moreover, while such a hand-held computer is being carried by a user, there is a high possibility that launching button switches will involuntarily be pressed in accordance with the user's motion so that an unwanted application program will be executed. This will also cause unnecessary battery power consumption.

SUMMARY OF THE INVENTION

It is therefore an object of the invention to provide an improved portable computer process and system. It is another object to provide an improved hand-held computer and process for operating hand-held computers It is yet another object to provide a portable computer system with application program launching switches and an operating method thereof, which can prevent the execution of unwanted operation and power consumption due to involuntary pressing of the launching switches.

According to one aspect of the invention, a computer system comprises: a memory for storing an operating system program, a plurality of application programs, and data information; a launcher having a multi-point switch for selecting one of the application programs, and for generating a plurality of launching signals in accordance with connection conditions of the switch; and a microcomputer for executing the selected application program in response to the launching signals.

The computer system further comprises a display device, wherein the microcomputer controls the display device to display a program menu selection menu on a screen of the display device when the movable contact is connected to one of the fixed contacts. The microcomputer scrolls application program items on the program selection menu in response to the launching signal. The program selection menu has a blank item which is no application program, and is displayed in the beginning of displaying the program selection menu.

According to another aspect of the invention, a computer system comprises: a launcher program in which a plurality of application programs are stored; a microcomputer having interrupt lines for wake-up from a sleep mode, and an interrupt processor for executing the launcher program in response to a launching signal supplied from the interrupt lines; and a launcher switch, having at least two switch contacts, for generating an interrupt signal to the interrupt lines when a user switches one of the switch contacts. The launcher program executes an application program selected by the launcher switch.

The launcher switch includes: a movable contact; a first fixed contact which generates a first launching signal for executing the launcher program or selected application program when it is electrically connected to the movable contact; and a second fixed contact which generates a second launching signal for moving a cursor to select one of the application programs registered in the launcher program when it is electrically connected to the movable contact.

The computer system further comprises a third fixed contact which generates a third launching signal for moving the cursor toward a reverse direction thereof when it is electrically connected to the movable contact.

According to still another aspect of the invention, there is a method of operating a computer system comprising a launcher program in which a plurality of application programs are registered, a launcher switch which has a movable contact and a plurality of fixed contacts and generates a launching signal when the movable contact is electrically connected to one of the fixed contacts, and a microcomputer which wakes up from a sleep mode in response to the launching signal. The method comprises the steps of: determining whether a launching signal is inputted from the launcher switch; if inputted therefrom, determining whether the computer system is at a normal state; if not at the normal state, converting a state of the microcomputer into the normal state; determining whether a launching signal for selecting and executing an application program is inputted from the launcher switch; if inputted in a predetermined time, executing a selected application program; and if not inputted in the predetermined time, converting the state thereof into the sleep mode.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DESCRIPTION OF THE PREFERRED EMBODIMENT

A hand-held computer comprises an application program launcher including a multi-point switch. Using the launcher, a user can select one of application programs registered in a menu list of a launcher program, and immediately execute it. If any one of application programs is not selected during a predetermined time after an input to the launcher, the hand-held computer enters a low power consumption sleep mode at once so as to prevent unnecessary battery power consumption.

Figure 1:
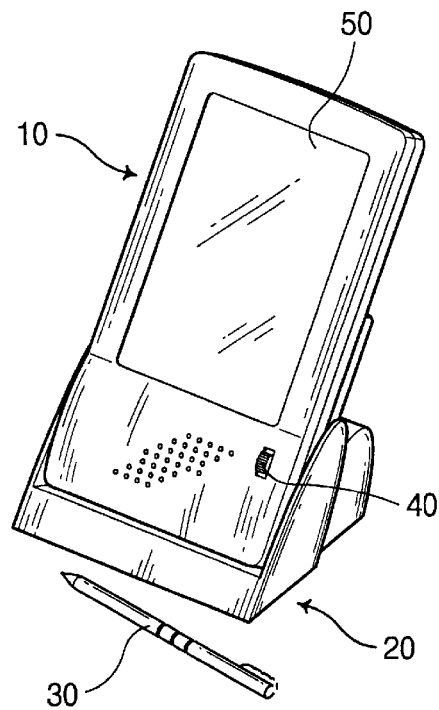
FIG. 1 is a perspective view of a hand-held computer in constructed in accordance with the principles of the present invention.
Figure 2:
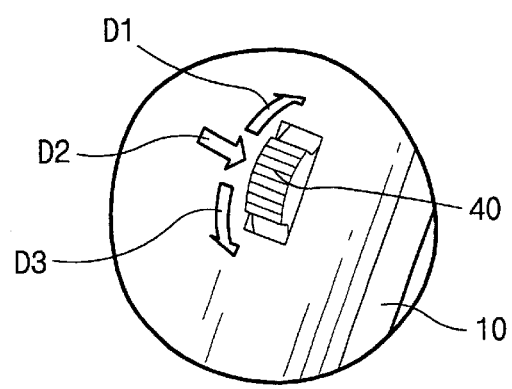
FIG. 2 is a detail drawing of a launcher switch of a multi-point switch type shown in FIG. 1.
Figure 3:
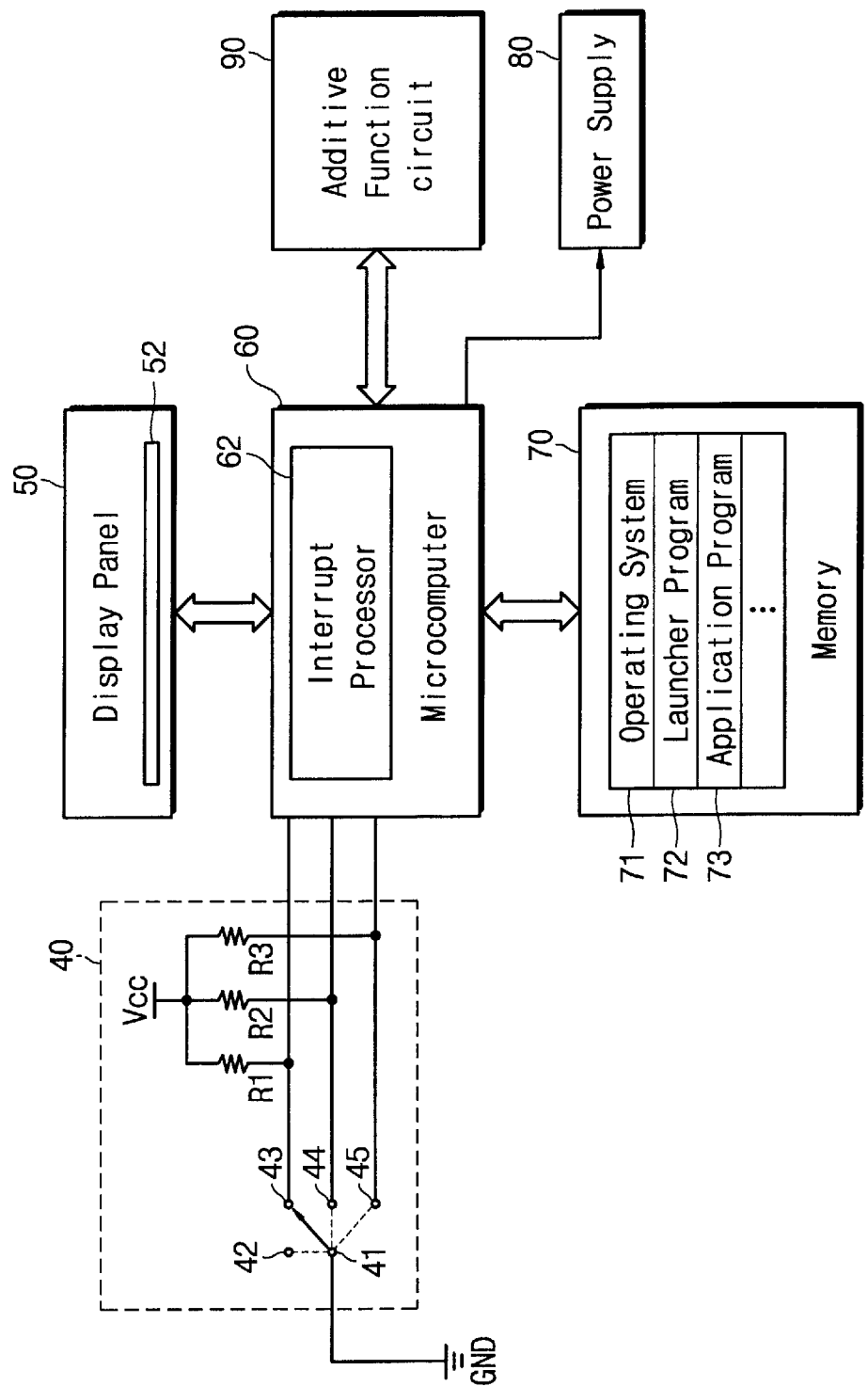
FIG. 3 is a block diagram showing circuit architecture of a hand-held computer in accordance with the present invention.

Referring to FIGS. 1 through 3, a hand-held computer 10 of the invention comprises a launcher switch portion including a multi-point switch 40 and a touch-sensitive liquid crystal display panel 52.

A battery (not shown) of hand-held computer 10 is charged using an external charger 20. A user can input data into the computer 10 using a stylus 30. Internal commands are executed by touching touch-sensitive panel 52.

The multi-point switch 40 is capable of closing or opening contacts D1, D2, and D3, forwardly, downwardly, and backwardly, respectively, and generates respective launching signals corresponding to its connection conditions.

FIG. 3 shows a circuit configuration of hand-held computer 10 according to one embodiment of the present invention. Computer 10 comprises a display panel 50, a microcomputer 60 connected to multi-point switch 40 (hereinafter, referred to as a launcher switch) and the display panel 50, a memory 70 connected to microcomputer 60, a power supply 80, and an additive function circuit 90 connected to microcomputer 60.

Data, inputted through touch-sensitive panel 52 of liquid crystal display panel 50, are provided to microcomputer 60.

Memory 70 stores an operating system 71, a launcher program 72, and a plurality of application programs 73.

Power supply 80 includes a rechargeable battery, power lines for receiving externally applied power, and lines for charging a battery. And, power supply 80 separately provides a standby power supply for a standby mode and a main power supply for a normal operation mode. Switch 40 and microcomputer 60 are supplied with power from power supply 80 in both the normal operation mode and the standby mode.

Additive function circuit 90 contains a modem circuit, a sound input/output circuit having a microphone and a loudspeaker, an ultraviolet transmission/reception circuit, and a data input/output port for communicating with other computer systems, etc., which are supplied with power from power supply 80.

Launcher switch 40 has a movable contact 41 and a plurality of fixed contacts 43, 44, and 45. One end of movable contact 41 is connected to a ground voltage GND and the other thereof is selectively connected to one of fixed contacts 43–45. Fixed contacts 43–45 are connected to interrupt lines of microcomputer 60 and to a power supply voltage Vcc through resisters R1, R2, and R3, respectively.

Upon being pressed in a direction (i.e., a forward, backward, or downward direction), movable contact 41 is electrically connected to corresponding one of fixed contacts 43, 44, and 45. So a launching signal is generated, and then is inputted to the microcomputer 60 through a corresponding interrupt line. If movable contact 41 is not pressed toward any direction, it is located in a non-contact 42. Using launcher switch 40, a user can power on/off hand-held computer 10 or select and execute application programs.

Microcomputer 60 has an interrupt controller 62, receiving a launching signal from launcher switch 40 through the interrupt line and carrying out control operation corresponding to each of the launching signals.

Figure 4:
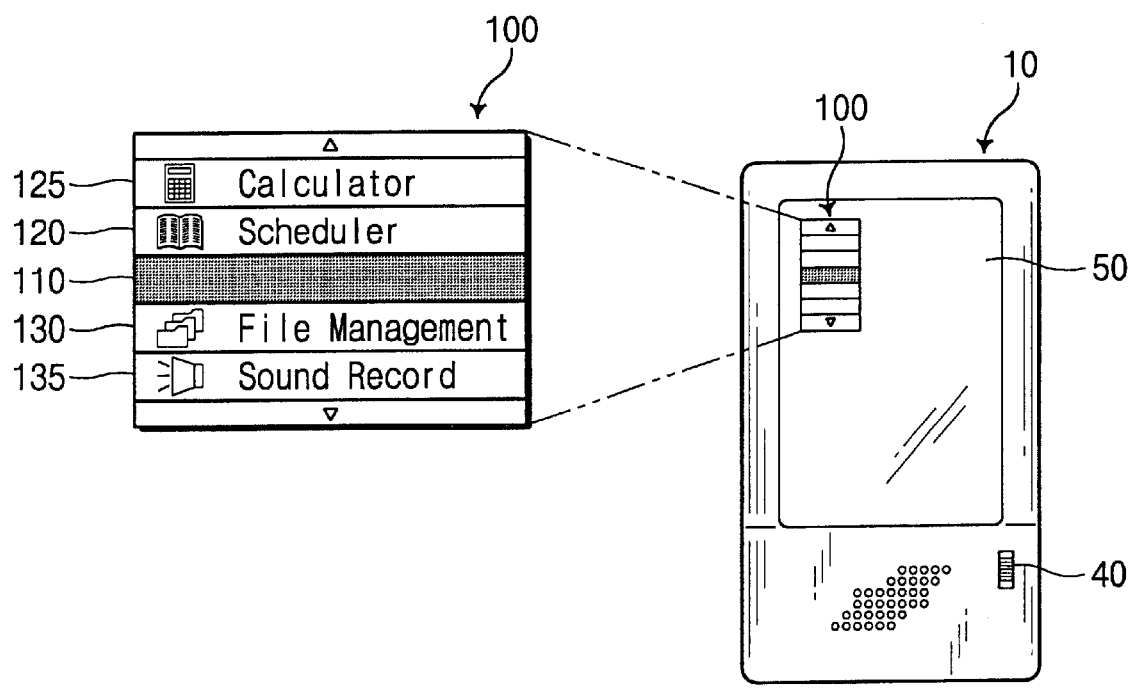
FIG. 4 shows an example of a menu list of a launcher program.

As shown in FIG. 4, launcher program 72 stored in memory 70 has a menu list 100 for registering a plurality of application programs. When the launcher program is executed, menu list 100 is displayed in a screen of display panel 50. A plurality of application programs 120, 125, 130, and 135 and a blank item 110 are included in the menu list 100. Application program items can be registered additionally, deleted, and changed. Blank item 110 is selected in the beginning of program execution. A user moves a cursor position using launcher switch 40, selecting and executing an application program. Menu list 100 includes a power off item (not shown) and a sleep mode item (not shown). The user selects the power off item and the sleep mode item to power off hand-held computer 10 and to force the computer into a sleep mode.

Figure 5:
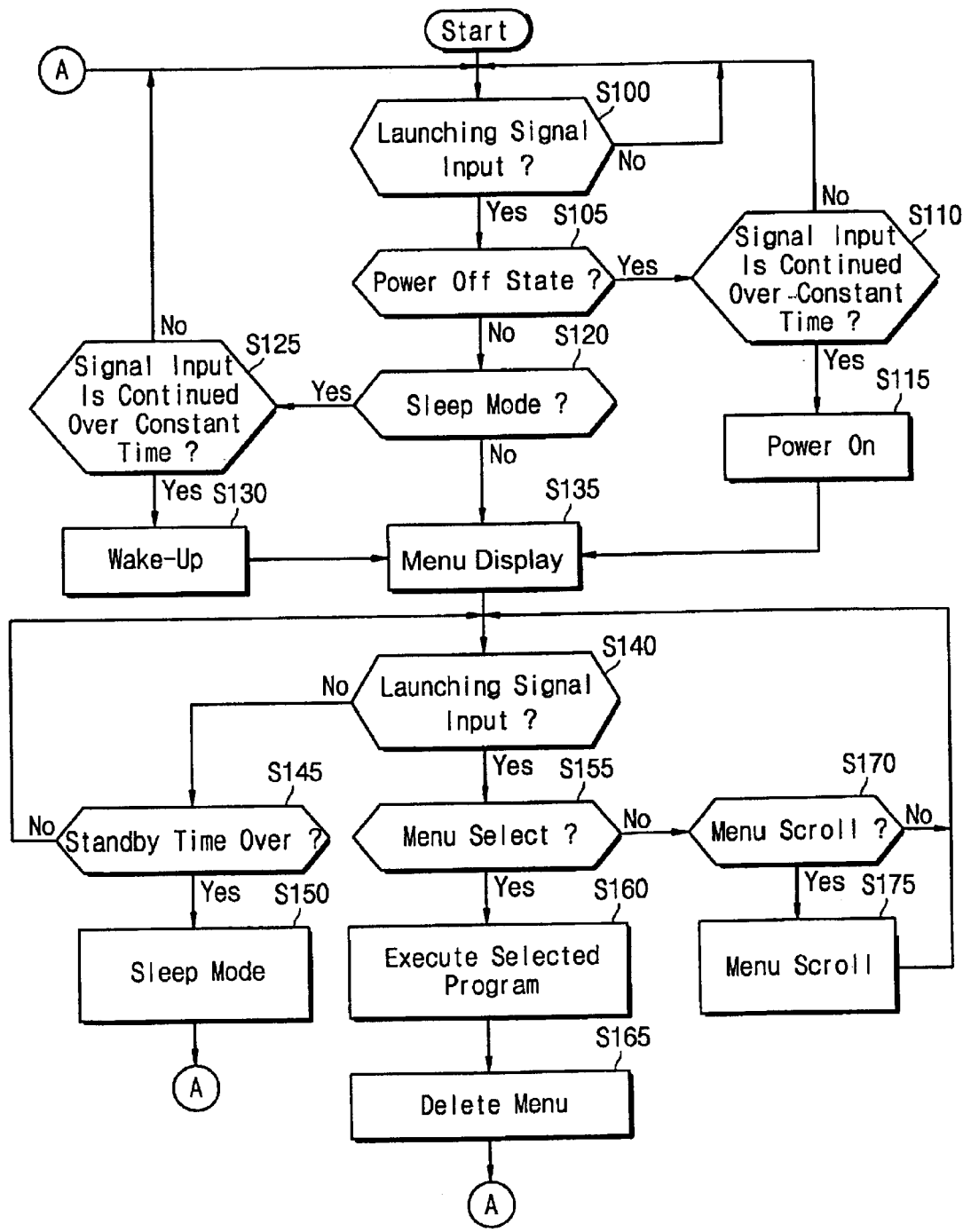
FIG. 5 is flowchart showing control steps of a microcomputer shown in FIG. 3.

FIG. 5 is a flowchart illustrating control operations of microcomputer 60 in accordance with the present invention. Referring to FIG. 5, in step S100, it is determining whether a launch signal is inputted from launcher switch 40. When the launching signal is inputted, an interrupt processing routine is performed by interrupt processor 62 within microcomputer 60, and then flow proceeds to step S105, wherein it is determined whether hand-held computer 10 is at a power-off state.

When computer 10 is in the power-off state, it is determined whether the launching signal is inputted [before the end of] continuously for a predetermined time interval at step S110. If so, flow proceeds to step S115 wherein hand-held computer 10 is powered on; that is, power supply 80 provides main power to the system. If not in step S105, flow proceeds to step S120. In this step S120, it is determined whether hand-held computer 10 is at a sleep mode. If so, it is determined at step S125 whether the launching signal is inputted [before the end of] continuously for the predetermined time interval. If so, in step S125, hand-held computer 10 is waked up at step S130.

If hand-held computer 10 is in a normal state, flow proceeds to step S135 wherein a menu list 100 is displayed on the screen of display panel 50. That is, a launcher program 72 is executed to display application programs registered in menu list 100. A blank item 110 is located in the middle of the displayed menu list 100, and indicated by a cursor.

When hand-held computer 10 is in a power-off state or a sleep mode, the microcomputer wakes up hand-held computer 10 to display menu list 100 only when the launching signal is inputted from launcher switch 40. When computer 10 is in a normal state, microcomputer 60 responds to the launching signal input at once and then displays menu list 100 on the screen. This operation responds to only a launching signal generated by electrically connecting a movable contact 41 to a fixed contact 44.

In step S140, the microcomputer 60 determines whether the launching signal is also inputted while displaying menu list 100. If not inputted, flow proceeds to step S145 wherein it determined whether a predetermined standby time interval is over. If so, hand-held computer 10 enters the sleep mode at step S150. Thus, it is possible to prevent the hand-held computer 10 from continuously consuming unnecessary power. When the launching signal is inputted in step S140, microcomputer 60 determines whether a menu item (not the blank item) is selected for execution of an application program at step S155. If so, flow proceeds to step S160 wherein the selected application program is executed, and thereafter, in step S165, menu list 100 is deleted.

If not at step S155, it is determined at step S170 whether the launching signal is inputted for scrolling the menu. That is, it is determined whether movable contact 41 of launching switch 40 is pressed toward one direction (forwardly or backwardly). If there is an input for scrolling the menu, flow proceeds to step S175 wherein a cursor of menu list 100 is scrolled toward a corresponding direction. If not inputted for scrolling the menu, step S170 returns to step S140.

According to the invention, although a user mistakenly presses a launching signal to operate a hand-held computer, an application program is not executed without selecting a menu item. Thereafter, the standby time (predetermined time interval) has elapsed without any input, the hand-held computer automatically enters the sleep mode. Therefore, it is possible to prevent consumption of unnecessary power.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A method of preventing unwanted, accidental launching of an application program and concomitant power consumption in a computer system, said system comprising a launcher program in which a plurality of application programs are registered, a launcher switch for generating a launching signal to cause an application program to begin execution, and a microcomputer which performs an interrupt in response to the launching signal, the method comprising steps of:
   (a) determining an operating mode of the computer system in response to the generated launching signal when the launcher switch is activated;
   (b) when the operating mode is determined to be a normal mode, executing said launcher program to display a menu list on a screen of the computer system, said menu list including menu items identifying said plurality of application programs and a blank menu item;
   (c) determining whether said launching switch is activated within a predetermined time period while said menu list is displayed;
   (d) if said launching switch is not activated within said predetermined time period, changing said operating mode from the normal mode to a sleep mode to conserve power;
   (e) if said launching switch is activated within said predetermined time period, determining whether one of said menu items identifying one of said plurality of application programs is selected;
   (f) if one of said menu items identifying one of said plurality of application programs is not selected, determining whether the generated launching signal is a menu scroll signal;
   (g) if said generated launching signal is not a menu scroll signal, returning to step (c) and determining whether said launching switch is activated again within said predetermined time period while said menu list is displayed, the launching of any of the application programs being prevented until it is determined in step (e) that one of said menu items identifying one of said plurality of application programs is selected; and
   (h) if it is determined in step (e) that one of said menu items identifying one of said plurality of application programs is selected; launching the selected application program.

2. The method as set forth in claim 1, further comprising a step of deleting displayed menu list from the screen when an application program is launched.

3. The method as set forth in claim 1, further comprising a step of:
   when the operating mode is determined in step (a) to be a power off mode, changing said operating mode to the normal mode by turning power on to said computer system if said launching signal is detected over a constant time period, and then performing steps (b)–(h).

4. The method as set forth in claim 1, further comprising a step of:
   when the operating mode is determined in step (a) to be the sleep mode, changing said operating mode to the normal mode by waking up said computer system if said launching signal is detected over a constant time period, and then performing steps (b)–(h).

5. The method as set forth in claim 1, wherein step (a) comprising steps of:
   determining the operating mode of the computer system is one of a power off mode, the sleep mode or the normal mode;
   when the operating mode is determined to be the power off mode, changing said operating mode to the normal mode by turning power on to said computer system if said launching signal is detected over a constant time period, and then performing steps (b)–(h); and
   when the operating mode is determined to be the sleep mode, changing said operating mode to the normal mode by waking up said computer system if said launching signal is detected over said constant time period, and then performing steps (b)–(h).

6. The method as set forth in claim 1, if it is determined in step (f) that the generated launching signal is a menu scroll signal, determining whether the menu scroll signal is for scrolling a cursor in a forward direction or a backward direction, and moving said cursor in the determined forward direction or backward direction over the menu list, one of said menu items being selected as indicated by the position of said cursor over said menu list when the scrolling of the cursor is stopped.

* * * * *